United States Patent Office 3,030,350
Patented Apr. 17, 1962

3,030,350
CATALYST COMPOSITIONS AND CATALYTIC OLEFIN POLYMERIZATION
Johan R. de Jong and Johan M. Goppel, Amsterdam, Netherlands, assignors to Shell Oil Company, New York, N.Y., a corporation of Delaware
No Drawing. Filed Feb. 18, 1958, Ser. No. 715,861
Claims priority, application Netherlands Feb. 22, 1957
19 Claims. (Cl. 260—94.9)

This invention relates to improved catalyst compositions particularly effective in catalyzing the low-pressure polymerization of olefins, to the method of their production, and to improvements in the polymerization of olefins.

It is known that polymers of alpha-olefins may be prepared at low temperatures and pressures in the presence of certain catalyst compositions. These processes are conducted at temperatures ranging from about ambient temperatures to about 120° C. and at pressures below 500 atm. The term "low-pressure olefin polymerization" as used throughout this specification and the attached claims is intended to mean alpha-olefin polymerization conducted at pressures below 500 atm. thereby distinguishing from prior art ethylene polymerization processes carried out at pressures in the neighborhood of 1000 atm. and higher. The catalysts employed in the "low-pressure polymerization" of alpha-olefins are designated in the art generally as "Ziegler catalysts" or "low-pressure polymerization catalysts." These catalysts are capable of polymerizing the alpha-olefins as, for example: ethylene, butene-1, propylene, their homologues; styrene; and other alpha-olefins, at pressures below 500 atm.

The term "low pressure olefin polymerization catalysts" as used in the present specification and attached claims is intended to mean the "Ziegler catalysts" or "low-pressure polymerization catalysts" heretofore indicated as effective in catalyzing alpha-olefins at processes below 500 atms. The "low-pressure olefin polymerization catalysts" employed in preparing the novel catalyst compositions of the invention preferably comprise catalysts of one of the following groups I through IV inclusive:

I. The product formed by mixing at least one compound of a metal of groups IV to VI, inclusive, of the periodic table, for example, the halides, e.g., $TiCl_4$ and/or $TiCl_3$, with at least one of the following compounds:

(a) An aluminum trialkyl compound such as, for example, aluminum triisobutyl;

(b) An aluminum compound of the general formula $R_1R_2AlX_1$, wherein $R_1$ and $R_2$ are similar or dissimilar and each represent hydrogen or a hydrocarbon radical, and X represents a member of the group consisting of hydrogen, halogen, an alkyloxy or aryloxy group or the residue of a secondary amine or amide, mercaptan, thiophenol, carboxylic acid or sulphonic acid;

(c) Magnesium and zinc alkyls or Grignard compounds.

II. The product formed by mixing a metal belonging to group VIII of the periodic table such as nickel, cobalt or platinum, or manganese with an aluminum compound of the general formula $R_1R_2AlHal$ wherein $R_1$ and $R_2$ have the same meaning indicated in the foregoing paragraph I(b), and Hal signifies halogen, e.g., chloride, etc.

III. The products obtained by reacting a compound of a metal of groups IV, V, VI and VIII of the periodic table and manganese with a compound capable of reducing said metal compounds.

IV. The products obtained by reacting together $AlCl_3$, aluminum or an alkali metal such as potassium and titanium tetrachloride.

A particularly suitable type of catalyst comprises the products obtained by reacting titanium tetrachloride with $Al(C_2H_5)_2Cl$ or with an aluminum trialkyl such as aluminum triisobutyl.

It has been disclosed heretofore to employ the "low-pressure olefin polymerization catalysts" in certain inert low-viscosity low-liquid media such as, for example, relatively low-boiling paraffins. Suspensions of these catalysts in the inert low viscosity media, usually employed therefor heretofore, have the disadvantage of not being stable. The suspended catalyst particles agglomerate and sedimentation occurs. Consequently, when these catalyst suspensions are prepared outside the polymerization reactor, it is difficult to pass these suspensions into the polymerization reactor by means such as, for example, pumping, because the supply lines clog up repeatedly. The supply of catalyst to the polymerization reactor is therefore irregular and the quality of the polymer formed is adversely affected. Uniformity of product quality of the polymer thus prepared becomes exceedingly difficult to obtain.

It has now been found that the above-mentioned drawbacks may be overcome according to the invention by using as the liquid vehicle for the catalyst suspension a substantially inert, liquid medium which has a viscosity of more than 5, preferably of more than 7 centistokes at the lowest temperature occurring or employed during the formation, transport, storage and any further handling of the suspension (suspension temperature). The catalyst compositions of the invention thus consist essentially of a catalyst suspension suitable for use in catalyzing "low-pressure olefin polymerization" consisting essentially of a "low-pressure olefin polymerization catalyst" suspended in a substantially inert liquid medium having a minimum viscosity of 5 centistokes.

The catalyst suspensions are prepared by combining a "low-pressure polymerization catalyst," or the components leading to the formation of this catalyst, with the liquid of high viscosity. The resulting mixture may be subjected to suitable stirring, agitation, or the like, by conventional means. When components leading to formation of the catalyst (pre-catalysts), as is the case in forming suspensions of Ziegler-type catalysts, are added to the high-viscosity liquid, and the added components permitted to interact in the liquid, it is essential that the liquid medium preferably employed be inert with respect to such catalyst-forming components (pre-catalysts). As it relates to a catalyst composition prepared from say, aluminum diethyl chloride and titanium tetrachloride, the two ingredients (pre-catalysts) may be added directly to the high-viscosity liquid or they may first be separately added to separate portions of the suspending high-viscosity fluid and the mixtures thus obtained combined. Comprised within the scope of the invention is the initial interaction of the pre-catalysts in liquid media other than the high-viscosity liquids to form the catalyst. The catalyst so obtained is then separated from the liquid medium in which it was formed and suspended in the high-viscosity medium having a viscosity of at least 5 centistokes. Thus in the preparation of a catalyst suspension from, say aluminum diethyl chloride and titanium tetrachloride, the two pre-catalysts may be brought together in an inert hydrocarbon such as pentane, hexane, isobutane, benzene, toluene, and the like. There will be formed a precipitate which constitutes the catalyst. This is separated from the hydrocarbon medium in which it was formed and suspended in the suitable high-viscosity medium having a minimum viscosity of 5 centistokes.

When preparing the suitable catalyst suspensions by reacting the pre-catalysts in the high-viscosity medium in accordance with the invention a liquid medium is preferably employed which has a viscosity of more than 12 centistokes and is liquid at room temperature and preferably even at 0° C. By the expression "reaction temperature" is meant the temperature which, when the catalyst is prepared by a reaction between two or more catalyst components (pre-catalysts), occurs at or is employed to favor the reaction between these catalyst components. This temperature is usually in the range of from 20° to 100° C.

The stability of the suspensions according to the invention is generally so high that there is substantially no depositing of solid particles on the walls of the reactors and/or lines.

Examples of the suitable viscous media used in preparing the catalyst suspensions are high-viscosity hydrocarbons or hydrocarbon mixtures such as the refined oils known in the art as "white oils" or "white mineral oils" whose viscosity may vary from approximately 30 to 250 centistokes at 20° C. and from approximately 10 to 55 centistokes at 50° C. These white oils include the technical white oils of naphthenic type which have been refined by the Edeleanu process and treated with oleum to remove at least a substantial part of their aromatics. More specific examples of these are the white oils having a viscosity of 95 and 21 centistokes at 20° C. and 50° C. respectively; the medicinal white oils which have a viscosity of 30, 130 and 230 centistokes, respectively, at 20° C. and of 10, 30 and 50 centistokes, respectively, at 50° C.; etc.

The viscous media used according to the invention also comprise mixtures of a high-viscosity medium with a liquid whose viscosity is lower than 5 centistokes. Examples of such mixtures are mixtures of white oils with a hydrocarbon solvent of the category hitherto used in "low-pressure olefin polymerization," such as isooctane, etc. The ratio between the two said components in such admixture must, of course, be such that at the suspension temperature or reaction temperature the resultant mixture has a viscosity of more than 5 centistokes.

If desired, the inert, or substantially inert, viscous medium which is to be used according to the invention and has a viscosity of more than 5 centistokes at the suspension or reaction temperature, may also contain as a component an inert medium having a viscosity of less than 5 centistokes at the said temperature, to which component medium such a quantity of an inert high-molecular substance has been added that the said desired viscosity is attained by the resultant mixture. The high molecular weight substance to be used for this purpose may very suitably be a synthetic or natural, high-molecular, viscous, waxy or solid substance, such as, for example, a polymer. Suitable polymers for this purpose are polyethylene and polyisobutylene. It will be understood that the quantity of the high-molecular substance to be added depends among other things on the nature of the specific substance, of the low-viscosity medium, and also on the desired viscosity to be attained. Thus, for example, by adding 3% by weight of polyisobutylene to isooctane the viscosity of the medium could be increased from approximately 0.7 to approximately 120 centistokes at 10° C. When such media are used in the polymerization the resultant polymer can be readily freed from these high-molecular substances by selective extraction. This treatment is, of course, generally desired only if the polymer added to the medium differs from the polymer formed. If desired, these high-molecular substances may also be added to media having a viscosity of more than 5 centistokes at the suspension or reaction temperature.

According to a very attractive embodiment of the invention the stable catalyst suspension preferably contains one or more suspension stabilizers and/or peptizing agents which are inert or substantially inert with respect to the catalyst. It has been found that the presence of such stabilizers and/or peptizing agents helps to counteract the agglomeration of the suspended catalyst particles and/or further inhibits the sedimentation of the suspended catalyst particles.

These suspension stabilizers and/or peptizing agents are generally used in a quantity of 20-100% by weight, based on the catalyst. Examples of suitable suspension stabilizers and/or peptizing agents which may be employed in the preferred embodiment of the novel process, are alcoholates of mono- or polyvalent metals, such as aluminum trioctoxide, etc. Other examples are the isooctylphenol ether of polyoxyethylene glycol, and also fatty acid salts of mono- or polyvalent metals.

The stable viscous catalyst suspension of the invention may be prepared in the polymerization reactor and used as such for the polymerization reaction; the monomer to be polymerized being passed into the suspension. This method is applied in discontinuous polymerization processes. In such case te distinct benefits of the invention become particularly apparent after the catalyst suspension has been allowed to remain in the polymerization reactor for a time without immediately being used for the polymerization reaction. As a consequence of the unusual stability of the catalyst compositions of the invention these can be prepared at convenient times independent of processing schedules and stored for long periods of time within the reactor itself without deterioration of efficacy. In discontinuous polymerization reactions the catalyst suspension may be prepared outside the reactor and passed into the reactor via a suitable supply line, for example, by means of a pump. In continuous polymerization processes the catalyst suspension is preferably prepared outside the polymerization reactor, and then continuously introduced in the reactor as a stable viscous suspension. It is also possible to prepare the suspension in a low-viscosity medium and to bring this medium, immediately before it is pumped to the polymerization reactor, to the desired higher viscosity, for example, by cooling or by adding a high-viscosity medium or a polymer.

The viscous media employed in preparing the suspensions in accordance with the invention may be subjected to any suitable purification methods to effect the removal of undesirable constituents such as, for example, oxygen, water, organic impurities capable of reaction with catalyst components or with pre-catalyst components, or with olefin monomers during the use of the catalyst, etc. The purification treatment may comprise one or more such steps as for example: solvent extraction; distillation; extractive distillation; contact with adsorbents such as adsorptive clays, aluminous materials, silica gel, charcoal, etc., optionally in the presence of solvents; etc.

The catalyst suspensions, consisting essentially of a "low-pressure olefin polymerization catalyst" suspended in a fluid medium having a viscosity of at least 5 centistokes, are employed with advantage in the polymerization of any of the broad class of ethylenically unsaturated compounds. Preferred are the ethylenically unsaturated hydrocarbons having one or more double bonds, such as, for example, ethylene, propylene, butylenes, styrene, etc., the diolefins such as butadiene etc.; their homologues, etc. The invention is applied with advantage to the copolymerization of one or more such unsaturated compounds. A signal advantage of the invention resides in the ability to effect with greater efficiency the polymerization of the alpha-olefins under the conditions of "low-pressure olefin polymerization" with the aid of the novel catalyst suspensions.

The olefin polymerization reaction itself is preferably carried out in a low-viscosity medium such as usually employed for these reactions, e.g., isooctane, to which the viscous catalyst suspension has either been previously added, or is added during the polymerization.

When in preparing the stable viscous catalyst suspension, aluminum alcoholates are used as suspension stabilizers, both the reaction rate and the polymer yield are increased over that obtained in the absence of these added components.

In view of the effect on the polymerization rate of the viscosity of the catalyst suspension and of the stabilizer and/or peptizing agent employed, the invention makes possible the control of the polymerization rate within certain limits by varying this viscosity and/or by adding varying quantities of stabilizer and/or peptizing agent.

The polymerization of ethylenically unsaturated compounds, using the above-described viscous catalyst suspensions, is carried out under the "low-pressure olefin polymerizing" conditions, preferably, at a pressure below 100 atm. and at a temperature of from about 20° to about 150° C. The resulting polymers may be worked up in any known manner, for example, by treatment with alcohols, filtering off, washing out and drying.

The following examples are illustrative of the invention:

Example I

Effect of the viscosity of the medium in which the catalyst is suspended on the sedimentation rate of the suspended catalyst.

(A) A naphthenic medicinal grade white oil (A-1) which had been refined by the Edeleanu process and freed of aromatics by contact with oleum, and which had a specific gravity at 15/4° C. of 0.881, an average molecular weight of about 386, a pour point of <-30° C., and a viscosity of approximately 130 centistokes at 20° C. and of approximately 30 centistokes at 50° C. was further purified by dilution with pentane and passage through a column containing silica gel and $Al_2O_3$. The pentane was then removed by distillation. The treated oil developed only a light-yellow color on addition of $TiCl_4$.

With the aid of the oil thus treated a 5-10% by weight solution of $TiCl_4$ and also a separate 5-10% by weight solution of $Al(C_2H_5)_2Cl$ were prepared. Quantities of both solutions were mixed in a nitrogen atmosphere, whereupon the resultant mixture was diluted with the same oil to such an extent that the content of titanium compound, calculated as $TiCl_4$, was 100 mmol per liter and the content of aluminum compound, calculated as $Al(C_2H_5)_2Cl$, was 130 mmol per liter.

The mixture thus obtained, while still in a nitrogen atmosphere, was heated to 40° C. with stirring for one hour. A finely-dispersed, reddish-brown catalyst suspension (S-1) was formed. Even after standing for approximately three hours at 20° C. hardly any sedimentation or deposit of solid substance could be observed on the wall of the flask containing the mixture.

The operation was repeated under substantially identical conditions with the exception that iso-octane, having a viscosity of only 0.7 centistoke at 20° C. was used as the medium of suspension instead of the white oil; (the conditions otherwise remaining unchanged, the suspension (S-2) being obtained at 40° C.). After being allowed to stand for only 15 minutes at 20° C., a substantial amount of the initially suspended catalyst had settled out and a distinct deposit of solid substance was observed on the wall of the flask.

(B) The sedimentation rate of the finely-dispersed catalyst in the catalyst suspension S-1 prepared as described under (A) of the present Example I, was determined in 20-fold dilutions. This was carried out as follows:

After being homogenized by stirring at 20° C., part of the catalyst suspension S-1 prepared as described under (A) was diluted 20 times with isooctane. A second portion was also diluted 20 times with isooctane. Still another portion was diluted 20 times with a mixture of three parts by volume of a naphthenic white oil (having a viscosity at 20° C. of 30 centistokes and at 50° C. of 10 centistokes) and one part by volume of isooctane. The three diluted suspensions thus formed had a content of titanium compond, calculated as $TiCl_4$, of 5 mmol and an aluminum content, calculated as $Al(C_2H_5)_2Cl$, of 6.5 mmol per liter. After being homogenized again, 100 cc. of each of the suspensions diluted 20 times were introduced in a graduated glass cylinder (in a nitrogen atmosphere), from which the upper 80 cc. were removed by suction after a settling time of ½ hour. These quantities sucked off were filtered and dried and the residues obtained were weighed. The weights determined showed that when the suspension was diluted 20 times with isooctane, the 80 cc. of liquid sucked off still contained a quantity of solid substance in a suspended state amounting to approximately 5% by weight of the quantity of solid substance present in the same volume of the homogenized suspension. When the 20-fold dilution was carried out with the said white oil-isooctane mixture, this percentage was found to be approximately 20% by weight.

(C) In exactly the same manner as described in the foregoing section (B), the sedimentation rate of the catalyst suspension (S-2) prepared using isoctane as the liquid medium, as described under (A), was determined; the 20-fold dilution being effected exclusively with isooctane. In this experiment the result corresponding to the above percentage of solid substance retained in suspension was 0%.

Example II

A catalyst suspension (S-3) was prepared substantially as described in section (A) of the foregoing Example I with the exception that the liquid used to suspend the catalyst was isooctane to which 3% by weight of polyisobutylene having an average molecular weight of approximately 100,000 had been added (Vistanex-B 100-CX) thereby forming a liquid mixture having a viscosity of about 120 centistokes at 20° C. The sedimentation rate of the resulting suspension (S-3) was determined in the same manner as described in the foregoing section (B) of Example I. The 20-fold dilution was carried out with isooctane. The result in terms of corresponding value for solid substance retained in suspension was 4% by weight of the quantity of solid substance present in the same volume of the homogenized suspension.

Example III

A catalyst suspension, S-4, was prepared substantially as described in section (A) of the foregoing Example I with the exception that a naphthenic white oil, refined by the Edeleanu process and treated with oleum, having a specific gravity of 0.886 at 15/4° C., a pour point of -27° C., and a viscosity of approximately 230 centistokes at 20° C. and approximately 45 centistokes at 50° C. was used as the liquid medium. The resulting catalyst suspension, S-4, was examined to determine the sedimentation rate in the same manner as described in the section (B) of the foregoing Example I. The 20-fold dilution of the suspension was carried out using isooctane as the diluent. The result in terms of corresponding value for solid substance retained in suspension was 7% by weight of the quantity of solid substance present in the same volume of the homogenized suspension.

Example IV

A catalyst suspension, A-5, was prepared substantially as described in section (A) of the foregoing Example I with the exception that for the white oil therein used there was substituted as the liquid medium the same white oil diluted with an equal amount by volume of isooctane to obtain a liquid medium having a viscosity of only 3 to 4 centistokes at 50° C. The resulting catalyst suspension, S-5, was examined to determine the sedimentation rate in the same manner as described in the section (B) of the foregoing Example I. The 20-fold dilution of the suspension was carried out using isooctane as the diluent. The result in terms of corresponding value for solid substance retained in suspension was 0% by weight of the quantity of solid substance present in the same volume of the homogenized suspension.

Example V

The effect of stabilizing agents and/or peptizing agents on the sedimentation rate of the catalyst suspensions:

(A) A catalyst suspension, S-6, was prepared by adding $TiCl_4$ and $Al(C_2H_5)_2Cl$ to a white oil using the same white oil and substantially the same conditions used in the preparation of suspension S-1 in the foregoing section (A) of Example I, with the exception, however, that there was initially added to the white oil sufficient aluminum trioctoxide to obtain a concentration of 50 mmol thereof per liter of the white oil medium. The suspension S-6 so obtained was diluted 20 times with isooctane and the sedimentation rate then determined by the method described in section (B) of Example I. It was found that after a settling time of half an hour the percentage of solid substance retained in the upper $9/10$ part of the diluted suspension, calculated on the quantity of solid substance in the same volume of homogenized suspension, was approximately 60% by weight. When the sedimentation rate was determined using the white oil-isooctane mixture, as described in section (B) of Example I, to effect the 20-fold dilution, the corresponding value for percentage of solids retained was found to be approximately 80% by weight.

Example VI

The preparation of an aluminum trioctoxide-stabilized catalyst suspension described in the foregoing Example V was repeated under substantially identical conditions with the exception that the white oil used as liquid medium had a specific gravity of 0.886 at 15/4° C., a pour point of −27° C. and had a viscosity at 20° C. of approximately 230 centistokes and at 50° C. of approximately 45 centistokes. The sedimentation rate of the resulting catalyst suspension S-7 was determined as described in section (B) of foregoing Example I, using isooctane to effect the 20-fold dilution. It was found that the value for percentage of solid substance retained in suspension was 59% by weight.

Example VII

A catalyst suspension was prepared substantially as described in the foregoing Example II with the exception that to the liquid medium, consisting of isooctane and polyisobutylene, there was intially added sufficient aluminum trioctoxide to obtain a concentration of 50 mmol thereof per liter of the liquid medium. The resulting stabilized catalyst suspension S-8 was tested to determine the sedimentation rate by the method described in section (B) of Example I using isooctane to effect the 20-fold dilution. The results in terms of relative percentage value of solids retained was found to be approximately 24% by weight.

Example VIII

A catalyst suspension, S-9, containing a reaction product of $TiCl_4$ with $Al(C_2H_5)_2Cl$ suspended in a liquid medium consisting of equal proportions of white oil and isooctane was prepared as described in foregoing Example IV. The liquid medium used had a viscosity of only 3 to 4 centistokes at 50° C.

The operation was again repeated under substantially identical conditions with the exception that sufficient aluminum trioctoxide was initially added as stabilizing agent to the liquid medium to result in an aluminum trioctoxide content of 50 mmol per liter of the liquid medium. The resulting stabilized catalyst suspension is identified by the designation S-10.

Suspensions S-9 and S-10 were tested to determine the rate of sedimentation by the method described in section (B) of Example I, using isooctane to effect the 20-fold dilution. The value for percentage of solid substance retained in suspension was found to be 0% for the suspension S-9 and 19%, by weight, for the stabilized suspension S-10.

Activity of the catalyst suspensions prepared in accordance with the invention is evidenced by the following examples:

Example IX

Ethylene was polymerized by contact with the catalyst suspension, S-1, prepared as described in the foregoing Example I, and consisting of a suspension of $TiCl_4$ and $Al(C_2H_5)_2Cl$ in a white oil which had been heated to 40° C. during preparation. The catalyst suspension was forced by means of nitrogen pressure into a 500 cc. three-necked flask provided with stirrer and thermometer. Simultaneously there was introduced into the flask sufficien isooctane to result in a 20-fold dilution of the catalyst suspension. A total of 300 cc. of the 20-fold diluted catalyst suspension under nitrogen pressure was introduced into the reactor. Thereupon the nitrogen atmosphere in the reactor flask was replaced by ethylene and ethylene was continuously introduced into the catalyst suspension for a period of two hours. At the end of the two-hour period the polymerization was stopped by adding 100 cc. of methanol. The contents of the reactor were then filtered by suction over sintered glass. The solid polymer filtered off was washed twice with 100 cc. of methanol at 60° C. and then dried at 60° C. A yield of 32 grams of solid polyethylene per liter of reaction volume per hour was obtained.

Similarly relatively high yields of polyethylene are obtained when executing the ethylene polymerization under substantially identical conditions but substituting for the catalyst suspension the catalyst suspension S-4 prepared as described in the foregoing Example III.

Example X

The ethylene polymerization operation of the foregoing Example IX was repeated under substantially identical conditions but with the exception that the catalyst suspension S-6, containing aluminum trioctoxide as stabilizer, prepared as described in the foregoing Example V was used. A polyethylene yield of 140 grams per liter of reaction volume per hour was obtained.

Similarly high yields of polyethylene are obtained when repeating the operation under identical conditions but using the catalyst suspensions S-7 and S-8, prepared as described in the foregoing Example VI.

Example XI

Ethylene was polymerized with a catalyst suspension substantially as described in the foregoing Example IX, with the exception that as the catalyst suspension the catalyst suspension S-3, prepared as described in the foregoing Example II, was employed. The catalyst suspension S-3 consists essentially of a suspension prepared by adding $TiCl_4$ and $Al(C_2H_5)_2Cl$ to a liquid medium consisting of isooctane to which 3% by weight of polyisobutylene had been added to bring the viscosity of the liquid medium to 120 centistokes at 20° C. The polyethylene polymer obtained was freed of polyisobutylene by first washing with boiling benzene before proceeding with the washing with methanol. A yield of white, powdery polyethylene of 10 grams per liter of reaction volume per hour was obtained.

Example XII

Ethylene was polymerized substantially as described in the foregoing Example XI using substantially identical conditions but with the exception that as catalyst suspension there was employed the aluminum trioctoxide stabilized suspension S-8, prepared as described in the foregoing Example VII. The catalyst suspension, after the 20-fold dilution with isooctane thus contained 2.5 mmol of aluminum trioctoxide per liter of the diluted suspension. Under these conditions there was obtained a yield of approximately 130 grams of polyethylene per liter of reaction volume per hour.

The invention claimed is:

1. A catalyst composition effective in catalyzing the polymerization of olefins which consists essentially of a stable suspension of a particulate Ziegler-type low-pressure polymerization catalyst in an essentially hydrocarbon liquid which has a viscosity above 5 centistokes at the lowest temperature occurring during the formation, transportation and storage of said suspension, said catalyst being the product of mixing at least one halide of a metal of groups IV to VI, inclusive, of the periodic table with an aluminum alkyl.

2. A catalyst composition in accordance with claim 1 wherein said liquid is white oil having a viscosity of from about 30 to about 250 centistokes at 20° C.

3. A catalyst composition in accordance with claim 1 wherein said liquid is a mixture of white oil and isooctane.

4. A catalyst composition in accordance with claim 1 wherein said liquid is a mixture of isooctane and a hydrocarbon polymer.

5. A catalyst composition in accordance with claim 4 wherein said polymer is polyisobutylene.

6. A catalyst composition effective in catalyzing the polymerization of olefins which consists essentially of a stable suspension of a particulate Ziegler-type low-pressure polymerization catalyst together with a stabilizing agent in a hydrocarbon liquid, said catalyst being the product of mixing at least one halide of a metal of groups IV to VI, inclusive, of the periodic table with an aluminum alkyl, said stabilized liquid having a viscosity above 5 centistokes at the lowest temperature occurring during the formation, transportation and storage of said suspension.

7. A catalyst composition in accordance with claim 6 wherein the said stabilizing agent is a metal alcoholate and said liquid is a white oil having a viscosity of from about 30 to about 250 centistokes at 20° C.

8. A catalyst composition effective in catalyzing the polymerization of olefins which consists essentially of a stable suspension obtained by suspending titanium halide and an aluminum alkyl in a white oil having a viscosity of from about 30 to about 250 centistokes at 20° C.

9. A catalyst composition effective in catalyzing the polymerization of olefins which consists essentially of a stable suspension of a reaction product of aluminum-triisobutyl with a titanium halide in a white oil having a viscosity of from about 30 to about 250 centistokes at 20° C.

10. A catalyst composition effective in catalyzing the polymerization of olefins consisting essentially of a stable suspension of a reaction product of titanium tetrachloride with aluminum diethyl chloride in a white oil having a viscosity of from about 30 to about 250 centistokes at 20° C.

11. A catalyst composition effective in catalyzing the polymerization of olefins consisting essentially of a stable suspension obtained by adding titanium tetrachloride, aluminum diethyl chloride and a metal alcoholate stabilizing agent to a white oil having a viscosity of from about 30 to about 250 centistokes at 20° C.

12. A catalyst suspension in accordance with claim 11 wherein said metal alcoholate stabilizing agent is aluminum trioctoxide.

13. A catalyst composition effective in catalyzing the low-pressure polymerization of olefins which consists essentially of a stable suspension of the reaction product of titanium tetrachloride with aluminum diethyl chloride together with aluminum trioctoxide in a liquid medium consisting of isooctane containing polyisobutylene having a viscosity above 5 centistokes at the lowest temperature occurring during the formation, transportation and storage of said suspension.

14. The process for the production of a catalyst suspension effective in catalyzing the polymerization of olefins which comprises adding titanium halide and an aluminum alkyl to a white oil having a viscosity of from about 30 to about 250 centistokes at 20° C., and bringing the resulting mixture to a temperature in the range of from about 20° to about 100° C.

15. In a process for the polymerization of ethylenically unsaturated hydrocarbons at temperatures in the range of from about 20° to about 150° C. and at pressures below about 500 atm. in the presence of a particulate Ziegler-type low-pressure olefin polymerization catalyst resulting from mixing at least one halide of a metal of groups IV to VI, inclusive, and an aluminum alkyl, the improvement which comprises separately preparing said catalyst in the form of a stable suspension in an essentially hydrocarbon liquid which has a viscosity above 5 centistokes at the lowest temperature occurring during the transportation, storage and formation of said suspension, and introducing said catalyst suspension into the reaction zone where it is contacted with an ethylenically unsaturated hydrocarbon.

16. The process improvement according to claim 15 in which said liquid hydrocarbon is a white oil having a viscosity of from about 30 to about 250 centistokes at 20° C.

17. The process improvement according to claim 15 in which said liquid hydrocarbon is a white oil having a viscosity of from about 30 to about 250 centistokes at 20° C. to which has been added a metal alcoholate stabilizing agent.

18. In the process for the polymerization of ethylene at a temperature of from about 20° to about 100° C. and at pressures below about 500 atm. in the presence of a particulate Ziegler-type low-pressure polymerization catalyst, the improvement which comprises separately preparing said catalyst in the form of a stable suspension of the reaction product of titanium tetrachloride with aluminum alkyl in a white oil having a viscosity in the range of from about 30 to about 250 centistokes at 20° C. and introducing said catalyst suspension into the reaction zone wherein it is contacted with ethylene.

19. In the process for the polymerization of ethylene at a temperature of from about 20° to about 100° C. and at pressures below about 500 atms. in the presence of a particulate Ziegler-type low-pressure polymerization catalyst, the improvement which comprises separately preparing said catalyst in the form of a stable suspension of the reaction product of titanium tetrachloride with aluminum diethylchloride together with aluminum trioctoxide in a white oil which has a viscosity of from about 30 to about 250 centistokes at a temperature of 20° C. and introducing said catalyst suspension into the reaction zone wherein it is contacted with ethylene.

References Cited in the file of this patent

UNITED STATES PATENTS

| | | |
|---|---|---|
| 2,619,458 | McBride | Nov. 25, 1952 |
| 2,736,700 | Graham et al. | Feb. 28, 1956 |
| 2,824,145 | McCall et al. | Feb. 18, 1958 |
| 2,827,445 | Bartolomeo et al. | Mar. 18, 1958 |
| 2,843,577 | Friedlander et al. | July 15, 1958 |
| 2,898,327 | McCulloch et al. | Aug. 4, 1959 |

FOREIGN PATENTS

| | | |
|---|---|---|
| 533,362 | Belgium | May 16, 1955 |
| 540,459 | Belgium | Feb. 9, 1956 |